G. M. DUCAS.
AUTOMOBILE SIGNALING DEVICE.
APPLICATION FILED APR. 11, 1916.
1,233,203.
Patented July 10, 1917.
2 SHEETS—SHEET 2.
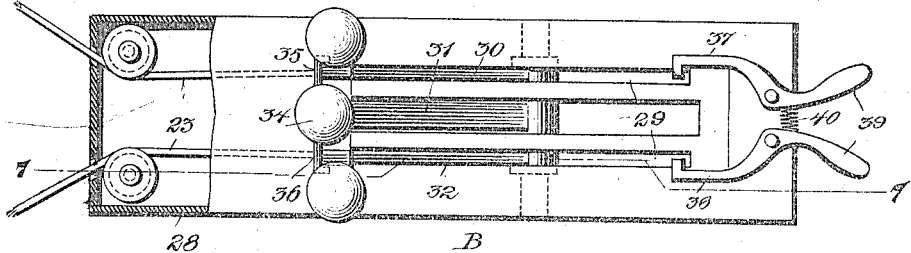
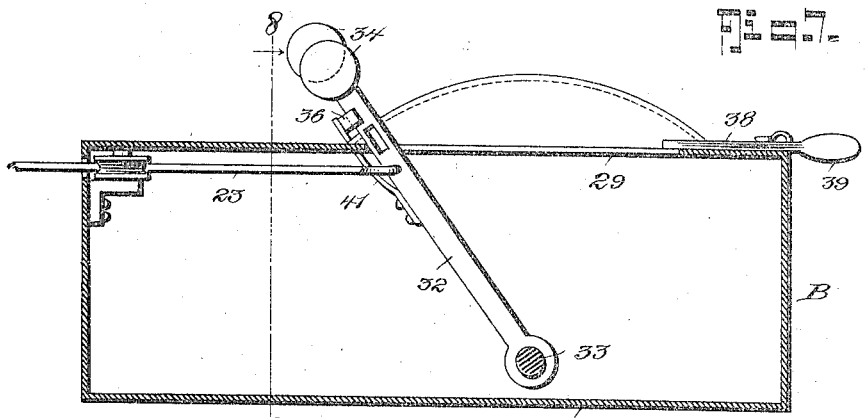
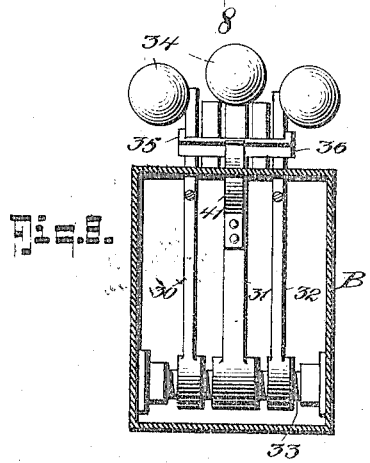
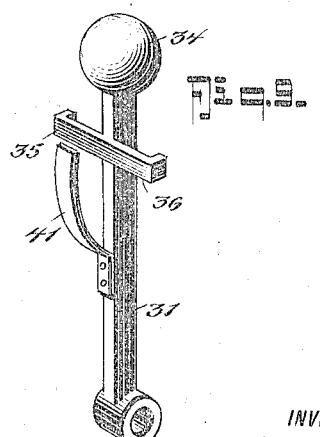
WITNESSES:
John D. Schutt
C. Bradway
INVENTOR
George M. Ducas.
BY Munn & Co
ATTORNEYS

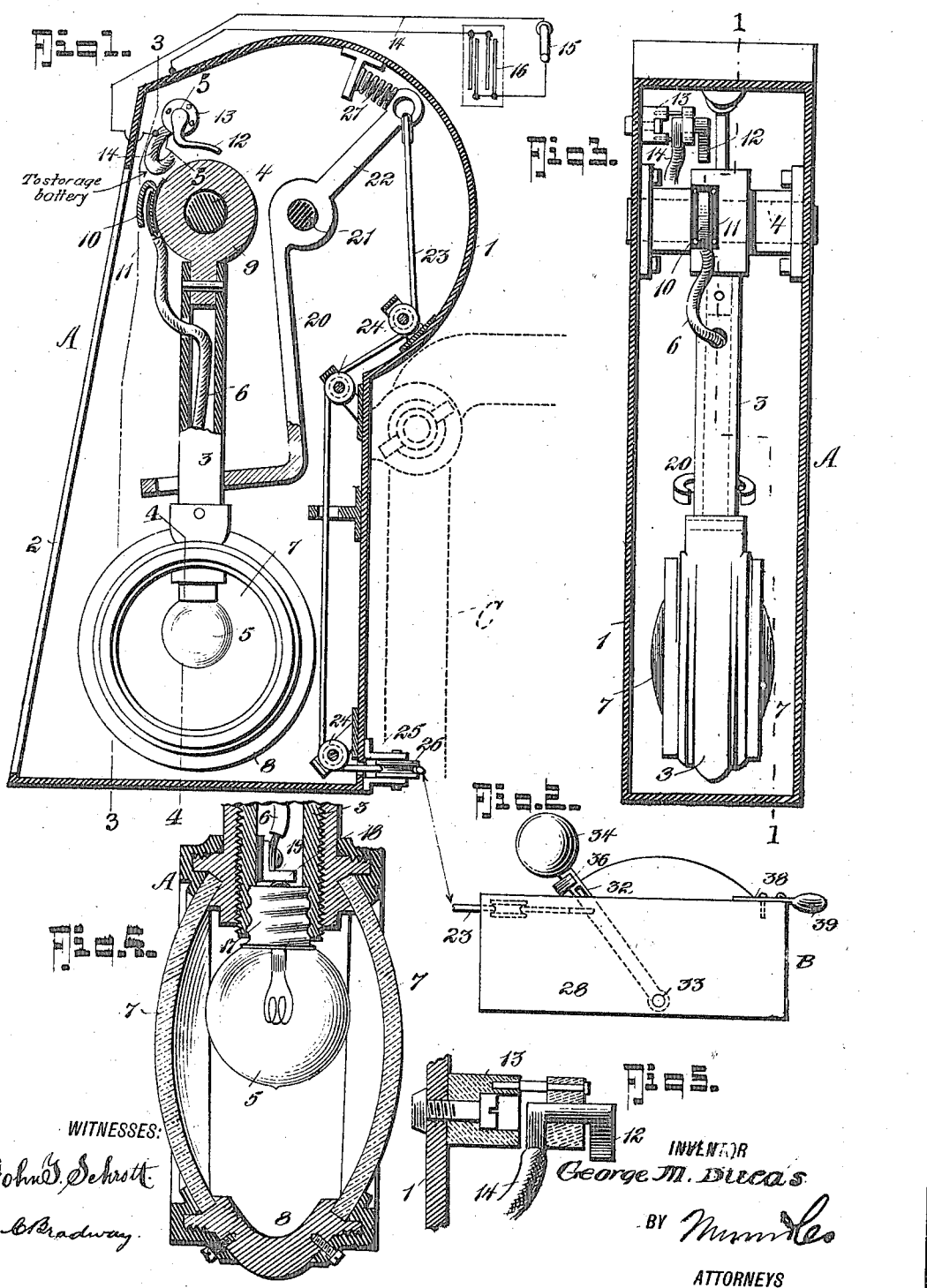

UNITED STATES PATENT OFFICE.

GEORGE M. DUCAS, OF BRIDGEPORT, CONNECTICUT, ASSIGNOR OF ONE-HALF TO HOLGER GRONAGER, OF BRIDGEPORT, CONNECTICUT.

AUTOMOBILE SIGNALING DEVICE.

1,233,203.

Specification of Letters Patent. Patented July 10, 1917.

Application filed April 11, 1916. Serial No. 90,347.

*To all whom it may concern:*

Be it known that I, GEORGE M. DUCAS, a citizen of the United States, and a resident of Bridgeport, in the county of Fairfield and State of Connecticut, have invented a new and Improved Automobile Signaling Device, of which the following is a full, clear, and exact description.

This invention relates to a signaling apparatus especially adapted for automobiles for indicating to the drivers of other automobiles or to pedestrians the direction in which the automobile is to turn, or the fact that the automobile is to be stopped, the apparatus being of that type in which arms or other indicators mounted at suitable points at opposite sides of the car can be thrown to and from indicating position where they will be in plain view.

The invention has for its general objects to improve and simplify the construction and operation of apparatus of the character referred to so as to be reliable and efficient in use, comparatively simple and inexpensive to manufacture, and so designed as to be under the convenient control of the driver.

A more specific object of the invention is the provision of novel indicating devices, which, during the day, are unilluminated, and during the night are illuminated, and which by means of a simple and effective actuating or controlling means can be either independently or simultaneously thrown to signaling position, the signaling device at the right being thrown to operative position when the vehicle is to be steered to the right, and the signaling device at the left being thrown to operative position when the automobile is to be steered to the left, and both devices being thrown to raised position when the car is to be stopped.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a vertical section of one of the signal devices, the section being taken on the line 1—1, Fig. 3;

Fig. 2 is a side view of the controller or actuating means for the signal devices;

Fig. 3 is a vertical section on the line 3—3, Fig. 1;

Fig. 4 is a detail sectional view on the line 4—4, Fig. 1, showing the details of the illuminated signal;

Fig. 5 is a detail sectional view on the line 5—5, Fig. 1;

Fig. 6 is a plan view of the controller or actuator;

Fig. 7 is a vertical sectional view on the line 7—7, Fig. 6;

Fig. 8 is a transverse sectional view on the line 8—8, Fig. 7; and

Fig. 9 is a perspective view of the central member of the controller.

Referring to the drawing, A designates one of the signal devices of the apparatus, and B is the controller therefor. It will be understood that two signal devices are employed, one at the right and the other at the left side of the car, so as to indicate the direction in which the car is to be turned. The device A comprises a suitable shaped casing 1 which may be fastened as shown in the present instance to the dash C of an automobile, and the outer lateral wall of the casing has an opening 2 out of which is adapted to swing a signal arm 3. This arm depends from a pivot 4 suitably mounted in the casing 1 at the upper portion thereof, and on the lower end of the arm is carried an electric lamp 5 which screws into the arm, which latter is tubular to accommodate the supply wire 6. The lamp 5 is inclosed within a suitable housing consisting of oppositely disposed red lenses 7 fastened in an annular frame or casing 8 of suitable construction. On the hub 9 of the arm 3 is carried a contact 10 separated by insulation 11 from the hub, and the wire 6 is connected with this contact. Another contact 12 is arranged in the top of the casing in such position as to be engaged by the contact 10 when the signal arm swings upwardly, to thereby close the lamp circuit when desired for night service. The contact 12 is journaled in a suitable support 13 of porcelain or other insulating material, and a wire 14 is connected with the contact, as shown clearly in Fig. 5. This wire leads to a switch 15 and source of current 16, as shown in Fig. 1, and the source may be grounded on the casing of the signal device so that through the latter and the arm 3 the base or shell 17 of the lamp 5 will be connected in circuit, it being understood that the central contact 18 engages a contact 19 within the arm 3, whereby, through the wire 6, contacts 11 and 12 and wire 14, the other terminal lamp will be connected with the source of current.

The signal arm 3 is normally disposed within the casing A and is adapted to be thrown from a vertical to an approximately horizontal position by an actuating lever 20 which is fulcrumed at 21 in the upper portion of the casing, and this lever has an upper arm 22 that is connected with a pull cord or equivalent element 23, there being guide pulleys 24 in the casing whereby the cord extends downwardly in the casing and passes out through an opening 25, thence around an external pulley 26 to the controller or actuator B. A down pull on the cable causes the lower extremity of the lever 20 to throw the signal arm upwardly to signaling position, and when the pull on the cord is removed, the arm returns by gravity to its concealed position, and the lever 20 also moves with it, and shock is taken up by a cushioning spring 27 arranged in the casing in such a position as to be struck by the upper arm 22 of the lever 20.

The controller B, which is preferably located at a point conveniently within reach of the driver, is adapted to operate the signal devices at the right and left side of the automobile independently or simultaneously. This controller comprises a box 28 which has a slot 29 at its top, and projecting upwardly out of this slot are three levers 30, 31, 32, the levers 30 and 32 being operative for actuating the right and left signal devices independently, and the lever 31 being adapted to operate both signal devices together. These levers are mounted on a common shaft 33, and their upper ends are formed with knobs or grips 34. The pull cords 23 are connected with the outer levers 30 and 32, but the inner lever is provided with oppositely extending lugs or arms 35 and 36 which engage in front of the levers 30 and 32, respectively, whereby backward movement of the central lever will cause the outer levers 30 and 32 to move with the central lever 31 as a unit, thereby pulling both signal devices up to signaling position. Spring-pressed catches 37 and 38 are arranged at the back portion of the box in such position that the levers 30 and 32 can be engaged thereby, for the purpose of causing the catches to hold the levers in rearward position, where they hold the signal devices raised. These catches automatically operate whether the levers 30 and 31 are independently actuated or simultaneously actuated, and the catches are released by pressing the grips or handles 39 of the catches together against the compression of the spring 40. When the catches are released, the levers 30 and 32 swing forwardly by reason of the dropping of the signal arms 3 and the levers. To reduce the shock as the controller levers move forwardly, the central lever has a cushioning spring 41 on its forward side which bears against the front end of the slot 29 in the top of the box.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A signal apparatus of the class described comprising a plurality of signal elements and means for actuating the same, said means consisting of a box, a pair of levers pivotally mounted in the box and extending out of the same, a connecting device between each lever and a corresponding signal element, a master lever mounted in the box and extending out of the same, means on the lever for engaging the first-mentioned levers for simultaneous operation, and catches mounted on the box for engaging only the first-mentioned levers when the latter occupy a position corresponding to the signaling position of the said elements.

2. A signaling apparatus of the class described comprising a plurality of signal elements and means for actuating the elements, said means comprising a supporting structure, a plurality of levers each connected with a corresponding element, a master lever having means engageable with the other levers for operating them simultaneously, and a catch means for each of the first-mentioned levers for locking the same in a position corresponding to the signaling position of the said elements.

3. A signal apparatus of the class described comprising a plurality of signal elements and means for actuating the elements, said means comprising a supporting structure, a plurality of levers each connected with a corresponding element, a master lever having means engageable with the other levers for operating them simultaneously, a catch means for each of the first-mentioned levers for locking the same in a position corresponding to the signaling position of the said elements, and a buffing device carried by the master lever.

GEORGE M. DUCAS.

Witnesses:
HOLGER GRONAGER,
GEORGE BESSEY.